United States Patent
Yamashita et al.

(10) Patent No.: US 8,948,696 B2
(45) Date of Patent: Feb. 3, 2015

(54) MODULATION CIRCUIT AND SEMICONDUCTOR DEVICE INCLUDING THE SAME

(75) Inventors: Yukiko Yamashita, Kanagawa (JP); Tatsuji Nishijima, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 865 days.

(21) Appl. No.: 12/572,808

(22) Filed: Oct. 2, 2009

(65) Prior Publication Data

US 2010/0087222 A1 Apr. 8, 2010

(30) Foreign Application Priority Data

Oct. 3, 2008 (JP) ................................. 2008-258443

(51) Int. Cl.
*H04B 7/00* (2006.01)
*H04L 27/04* (2006.01)
*G06K 19/07* (2006.01)

(52) U.S. Cl.
CPC ............ *H04L 27/04* (2013.01); *G06K 19/0723* (2013.01)
USPC ..................... 455/41.2; 455/127.1; 455/550.1; 340/10.1; 340/10.3; 340/870.07; 340/870.31; 235/451; 235/486; 235/492

(58) Field of Classification Search
USPC .................. 455/127.1, 41.2, 550.1; 340/10.3, 340/870.31, 10.1, 870.07; 235/492, 451, 235/486
See application file for complete search history.

(56) References Cited

U.S. PATENT DOCUMENTS

| | | | |
|---|---|---|---|
| 4,498,093 A * | 2/1985 | Allyn et al. .................... | 257/287 |
| 5,815,355 A | 9/1998 | Dawes | |
| 5,963,144 A * | 10/1999 | Kruest ......................... | 340/10.1 |
| 6,147,605 A | 11/2000 | Vega et al. | |
| 6,294,274 B1 | 9/2001 | Kawazoe et al. | |
| 6,909,326 B2 | 6/2005 | Jesme | |
| 7,000,837 B2 | 2/2006 | Akiho et al. | |
| 7,061,014 B2 | 6/2006 | Hosono et al. | |
| 7,282,782 B2 | 10/2007 | Hoffman et al. | |
| 7,297,977 B2 | 11/2007 | Hoffman et al. | |
| 7,319,368 B2 * | 1/2008 | Berhorst et al. .......... | 331/117 R |
| 7,323,356 B2 | 1/2008 | Hosono et al. | |
| 7,453,065 B2 | 11/2008 | Saito et al. | |

(Continued)

FOREIGN PATENT DOCUMENTS

| JP | 2000-059262 | 2/2000 |
|---|---|---|
| JP | 2005-251183 | 9/2005 |

(Continued)

OTHER PUBLICATIONS

International Search Report re application No. PCT/JP2009/065882, dated Oct. 27, 2009.

(Continued)

*Primary Examiner* — Junpeng Chen
(74) *Attorney, Agent, or Firm* — Husch Blackwell LLP

(57) ABSTRACT

An object of the present invention is to reduce the power consumption of a modulation circuit. The modulation circuit includes a load, a diode, and a transistor. An anode of the diode is electrically connected to one terminal of an antenna via the load; a cathode of the diode is electrically connected to one of a source and a drain of the transistor; the other of the source and the drain of the transistor is electrically connected to the other terminal of the antenna; and the transistor is controlled to be turned on or off in accordance with a signal input to a gate of the transistor.

22 Claims, 12 Drawing Sheets

(56) References Cited

U.S. PATENT DOCUMENTS

| | | |
|---|---|---|
| 7,462,862 B2 | 12/2008 | Hoffman et al. |
| 7,632,740 B2 | 12/2009 | Aoki et al. |
| 7,674,650 B2 | 3/2010 | Akimoto et al. |
| 8,030,178 B2 | 10/2011 | Aoki et al. |
| 8,134,156 B2 | 3/2012 | Akimoto |
| 8,238,152 B2 | 8/2012 | Asami et al. |
| 8,358,202 B2 * | 1/2013 | Takahashi .................... 340/10.3 |
| 8,436,354 B2 | 5/2013 | Aoki et al. |
| 2002/0021226 A1 * | 2/2002 | Clement et al. .......... 340/870.31 |
| 2003/0218222 A1 | 11/2003 | Wager, III et al. |
| 2004/0180637 A1 * | 9/2004 | Nagai et al. ................ 455/127.1 |
| 2005/0017302 A1 | 1/2005 | Hoffman |
| 2005/0174845 A1 | 8/2005 | Koyama et al. |
| 2005/0199959 A1 | 9/2005 | Chiang et al. |
| 2005/0237123 A1 | 10/2005 | Berhorst et al. |
| 2006/0043377 A1 | 3/2006 | Hoffman et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0197092 A1 | 9/2006 | Hoffman et al. |
| 2007/0194379 A1 | 8/2007 | Hosono et al. |
| 2007/0246546 A1 | 10/2007 | Yoshida |
| 2008/0006877 A1 | 1/2008 | Mardilovich et al. |
| 2008/0034335 A1 * | 2/2008 | Cheng et al. ...................... 716/5 |
| 2008/0174408 A1 * | 7/2008 | Takahashi .................... 340/10.3 |
| 2008/0191332 A1 | 8/2008 | Koyama et al. |
| 2008/0254569 A1 | 10/2008 | Hoffman et al. |
| 2009/0065590 A1 * | 3/2009 | Aoki et al. ..................... 235/492 |
| 2009/0272970 A1 * | 11/2009 | Aiba et al. ....................... 257/43 |
| 2009/0278122 A1 | 11/2009 | Hosono et al. |
| 2009/0280600 A1 | 11/2009 | Hosono et al. |
| 2009/0325341 A1 * | 12/2009 | Itagaki et al. .................. 438/104 |
| 2012/0126226 A1 | 5/2012 | Kuwabara et al. |
| 2012/0273778 A1 | 11/2012 | Asami et al. |

FOREIGN PATENT DOCUMENTS

| | | |
|---|---|---|
| JP | 2006-39744 | 2/2006 |
| JP | 2007-152939 | 6/2007 |
| JP | 2007-288718 | 11/2007 |
| JP | 2008-27288 | 2/2008 |
| JP | 2008-217778 | 9/2008 |
| WO | WO 2007/055142 A1 | 5/2007 |
| WO | WO 2008023553 A1 * | 2/2008 |

OTHER PUBLICATIONS

Written Opinion re application No. PCT/JP2009/065882, dated Oct. 27, 2009.

Kimizuka, N. et al., "Syntheses and Single-Crystal Data of Homologous Compounds, $In_2O_3(ZnO)_m$ (m=3, 4, and 5), $InGaO_3(ZnO)_3$, and $Ga_2O_3(ZnO)_m$ (m=7, 8, 9, and 16) in the $In_2O_3$—$ZnGa_2O_4$—$ZnO$ System," Journal of Solid State Chemistry, vol. 116, No. 1, Apr. 1, 1995, pp. 170-178.

Li, C. et al., "Modulated Structures of Homologous Compounds $InMO_3(ZnO)_m$ (M=In, Ga; m=Integer) Described by Four-Dimensional Superspace Group," Journal of Solid State Chemistry, vol. 139, 1998, pp. 347-355.

Kimizuka, N. et al., "Spinel, $YbFe2O_4$, and $Yb_2Fe_3O_7$ Types of Structures for Compounds in the $In_2O_3$ and $Sc_2O_3$—$A_2$—$O_3$—Bo Systems [A: Fe, Ga, or Al; B: Mg, Mn, Fe, Ni, Cu, or Zn] at Temperatures Over 1000° C.," Journal of Solid State Chemistry, vol. 60, 1985, pp. 382-384.

Nomura, K. et al., "Thin-Film Transistor Fabricated in Single-Crystalline Transparent Oxide Semiconductor," Science, vol. 300, No. 5623, May 23, 2003, pp. 1269-1272.

Nakamura, M. et al., "The Phase Relations in the $In_2$—$O_3$—$Ga_2ZnO_4$—$ZnO$ System at 1350° C.," Journal of Solid State Chemistry, vol. 93, No. 2, Aug. 1, 1991, pp. 298-315.

Nomura, K. et al., "Carrier Transport in Transparent Oxide Semiconductor with Intrinsic Structural Randomness Probed using Single-Crystalline $InGaO_3(ZnO)_5$ Films," Applied Physics Letters, vol. 85, No. 11, Sep. 13, 2004, pp. 1993-1995.

Nomura, K. et al, "Room-Temperature Fabrication of Transparent Flexible Thin-Film Transistors Using Amorphous Oxide Semiconductors," Nature, vol. 432, Nov. 25, 2004, pp. 488-492.

Nomura, K. et al., "Amorphous Oxide Semiconductors for High-Performance Flexible Thin-Film Transistors," Japanese Journal of Applied Physics, vol. 45, No. 5B, 2006, pp. 4303-4308.

Orita, M. et al., "Amorphous Transparent Conductive Oxide $InGaO_3(ZnO)_m$ (m≤4):a Zn4s conductor," Philosophical Magazine, vol. 81, No. 5, 2001, pp. 501-515.

Hosono, H. et al., "Working Hypothesis to Explore Novel Wide Band Gap Electrically Conducting Amorphous Oxides and Examples," Journal of Non-Crystalline Solids, vol. 198-200, 1996, pp. 165-169.

Hayashi, R. et al., "42.1: Invited Paper: Improved Amorphous In—Ga—Zn—O TFTS," SID Digest '08: SID International Symposium Digest of Technical Papers, vol. 39, May 20, 2008, pp. 621-624.

Hosono, H. "68.3: Invited Paper: Transparent Amorphous Oxide Semiconductors for High Performance TFT," SID Digest '07: SID International Symposium Digest of Technical Papers, vol. 38, 2007, pp. 1830-1833.

Hsieh, H.-H. et al., "P-29: Modeling of Amorphous Oxide Semiconductor Thin Film Transistors and Subgap Density of States," SID Digest '08: SID International Symposium Digest of Technical Papers, vol. 39, 2008, pp. 1277-1280.

* cited by examiner

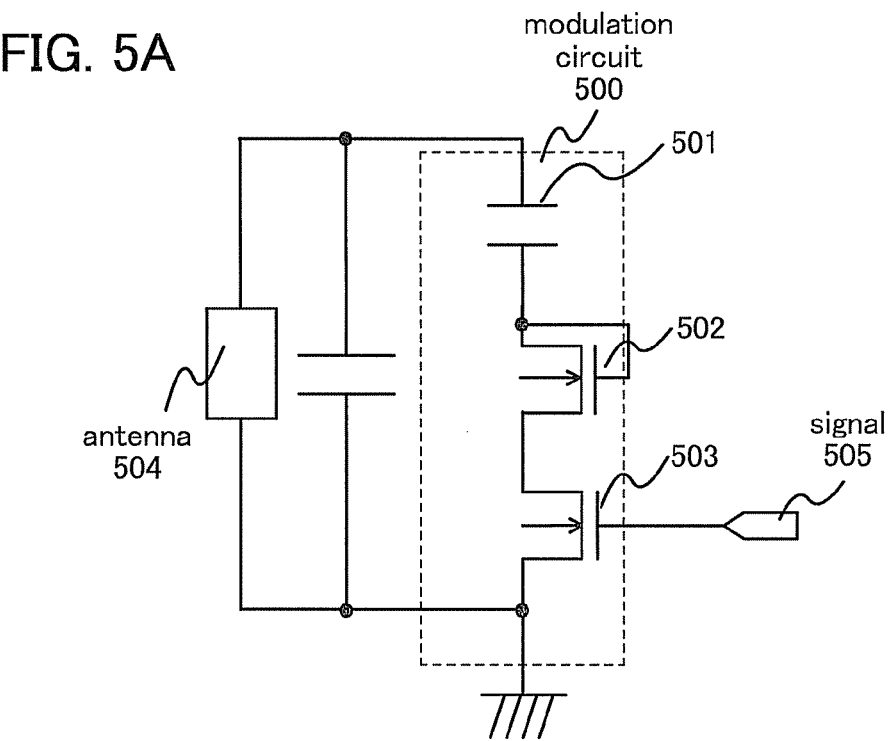
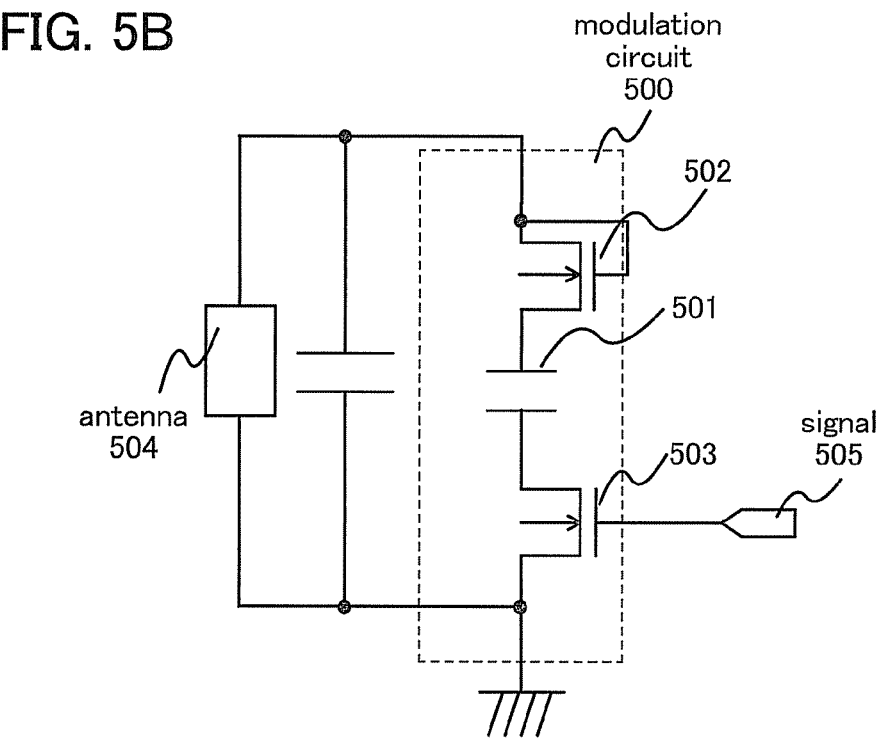

1101

1102

1103

1104a 1104b 1104c 1104d 1104e 1104f 1104g

MODULATION CIRCUIT AND SEMICONDUCTOR DEVICE INCLUDING THE SAME

TECHNICAL FIELD

The invention disclosed in this specification relates to a semiconductor device (a data carrier) capable of wirelessly communicating (transmitting/receiving) data. In particular, the present invention relates to a modulation circuit using a load switching method.

BACKGROUND ART

In recent years, individual identification technologies have attracted attention. In these technologies, Identification information is assigned to each object to recognize the history of information on the object and to be utilized in production, management, or the like. In particular, RFID (radio frequency identification) technologies for transmitting and receiving data through wireless communication have been developed in the market. A wireless communication system using RFID technologies is constituted by a wireless communication device (an interrogator) and a data carrier (a transponder), and data is wirelessly communicated between them. The wireless communication device means a device capable of wirelessly transmitting and receiving data, such as a reader/writer, a cellular phone, and a personal computer; in this specification, it is typically referred to as a reader/writer. The data carrier is generally called an RF tag, an ID tag, an IC tag, an IC chip, a wireless tag, an electronic tag, or the like; in this specification, it is typically referred to as an RF tag.

An RF tag includes a variety of circuits needed to wirelessly communicate data with a reader/writer, and one of these circuits is a modulation circuit. The modulation circuit has a function of modulating a carrier wave output from a reader/writer in accordance with a response signal output from a logic circuit, and transmitting a response signal to the reader/writer.

As a method for transmitting a response signal to a reader/writer, a load switching method is known, in which modulation is performed by changing the load impedance between the two terminals of an antenna included in an RF tag (for example, see Patent Document 1).

A modulation circuit using the load switching method includes a switching element and a load. As the switching element, a transistor is generally used, and a resistor is generally used as the load. The transistor and the resistor are connected in series between the two terminals of an antenna. A response signal is input from a logic circuit to a gate of the transistor.

In accordance with the response signal from the logic circuit, the transistor is turned on (brought into conduction) or turned off (brought out of conduction). When a transistor is in an off-state in an ideal modulation circuit, almost no current flows through the modulation circuit and the impedance between the two terminals of the antenna does not change either. Therefore, the potential of a terminal of an antenna is practically not influenced by the modulation circuit. On the other hand, when a transistor is in an on-state in an ideal modulation circuit, a drain current is generated in the transistor; thus, a certain current flows from an antenna to the modulation circuit and the potential of a terminal of the antenna changes. Therefore, the impedance between the two terminals of the antenna also changes. In this manner, in a modulation circuit using the load switching method, a transistor is controlled to be turned on or off in accordance with a response signal from a logic circuit, whereby the impedance between the two terminals of an antenna can be changed and data is transmitted to a reader/writer.

Since an antenna is a balanced device, a sine wave with a certain frequency is input to each of the two terminals of the antenna in an RF tag. A signal at one terminal of an antenna and a signal at the other terminal of the antenna have phases shifted from each other by 180°. However, description is given below on the assumption that the potential of the other terminal of the antenna is fixed (0 V) for the sake of simplicity.

REFERENCE

[Patent Document 1] Japanese Published Patent Application No. 2005-251183

DISCLOSURE OF INVENTION

Although an ideal modulation circuit should operate in the aforementioned manner, it is difficult that a modulation circuit actually manufactured operates in the aforementioned manner, and the following problems occur. When a transistor is turned on in accordance with a response signal from a logic circuit and one terminal of an antenna has a positive potential, a forward current flows from the one terminal of the antenna to the other terminal of the antenna via a modulation circuit. However, a high frequency wave (potential) flowing through the one terminal of the antenna varies constantly, and when the high frequency wave flowing through the one terminal of the antenna has a negative potential, the potential of the other terminal of the antenna (0 V) becomes higher than that of the one terminal of the antenna. At this time, a reverse current flows from the other terminal of the antenna to the one terminal of the antenna via the modulation circuit. This reverse current causes wasteful power consumption of the transistor. The proportion of the wasteful power consumption to all the power consumption of an RF tag is large, which prevents the maximum communication distance of the RF tag from increasing.

In view of the above problems, an object of one embodiment of the present invention is to reduce the power consumption of a modulation circuit. Another object of one embodiment of the present invention is to reduce the power consumption of the whole semiconductor device having a modulation circuit by reducing the power consumption of the modulation circuit. Still another object of one embodiment of the present invention is to increase the maximum communication distance of an RF tag by reducing the power consumption of the RF tag having a modulation circuit.

In order to achieve at least one of the above objects, one embodiment of the present invention employs the following structure. That is, in one embodiment of the present invention, a diode is provided between one terminal of an antenna and a switch (e.g., a transistor) in order to prevent a reverse current from being generated in a modulation circuit.

A modulation circuit of one embodiment of the present invention includes a load, a diode, and a switch. An anode of the diode is electrically connected to one terminal of an antenna via the load; a cathode of the diode is electrically connected to one terminal of the switch; and the other terminal of the switch is electrically connected to the other terminal of the antenna.

A modulation circuit of another embodiment of the present invention includes a load, a diode, and a transistor. An anode of the diode is electrically connected to one terminal of an antenna via the load; a cathode of the diode is electrically connected to one of a source and a drain of the transistor; the other of the source and the drain of the transistor is electrically connected to the other terminal of the antenna; and the transistor is controlled to be turned on or off in accordance with a signal input to a gate of the transistor.

A modulation circuit of another embodiment of the present invention includes a resistor, a diode, and a switch. One terminal of the resistor is electrically connected to one terminal of an antenna; the other terminal of the resistor is electrically connected to an anode of the diode; a cathode of the diode is electrically connected to one terminal of the switch; and the other terminal of the switch is electrically connected to the other terminal of the antenna.

A modulation circuit of another embodiment of the present invention includes a resistor, a diode, and a transistor. One terminal of the resistor is electrically connected to one terminal of an antenna; the other terminal of the resistor is electrically connected to an anode of the diode; a cathode of the diode is electrically connected to one of a source and a drain of the transistor; the other of the source and the drain of the transistor is electrically connected to the other terminal of the antenna; and the transistor is controlled to be turned on or off in accordance with a signal input to a gate of the transistor.

A modulation circuit of another embodiment of the present invention includes a capacitor, a diode, and a switch. One electrode of the capacitor is electrically connected to one terminal of an antenna; the other electrode of the capacitor is electrically connected to an anode of the diode; a cathode of the diode is electrically connected to one terminal of the switch; and the other terminal of the switch is electrically connected to the other terminal of the antenna.

A modulation circuit of another embodiment of the present invention includes a capacitor, a diode, and a transistor. One electrode of the capacitor is electrically connected to one terminal of an antenna; the other electrode of the capacitor is electrically connected to an anode of the diode; a cathode of the diode is electrically connected to one of a source and a drain of the transistor; the other of the source and the drain of the transistor is electrically connected to the other terminal of the antenna; and the transistor is controlled to be turned on or off in accordance with a signal input to a gate of the transistor.

In the above structures, the diode is formed over a flexible substrate, and the diode is a diode-connected transistor.

A semiconductor device of one embodiment of the present invention includes the modulation circuit, an antenna, a rectifier circuit, a demodulation circuit, a constant voltage circuit, and a logic circuit.

A semiconductor device of another embodiment of the present invention includes the modulation circuit, an antenna, a rectifier circuit, a demodulation circuit, a constant voltage circuit, a logic circuit, and a clock generation circuit.

The semiconductor device (RF tag) of one embodiment of the present invention does not depend on the frequency band used for communication with a reader/writer, and can be applied to an RF tag using any given frequency band. Specifically, the RF tag of one embodiment of the present invention can employ any of the following frequency bands: the HF band of 3 MHz to 30 MHz (e.g., 13.56 MHz), the UHF band of 300 MHz to 3 GHz (e.g., 433 MHz, 953 MHz, or 2.45 GHz), and a frequency of 135 kHz.

The RF tag of one embodiment of the present invention includes, in its category, any product capable of wirelessly communicating data, such as an ID tag, an IC tag, an IC chip, a wireless tag, and an electronic tag.

In addition, the modulation circuit of one embodiment of the present invention can be used for a semiconductor device other than the RF tag. For example, the modulation circuit of one embodiment of the present invention can be incorporated in a semiconductor device such as a cellular phone or a personal computer (preferably, a laptop personal computer), whereby data can be communicated between the semiconductor device and a reader/writer.

In this specification, the phrase "A and B are electrically connected" refers to the case where A and B are electrically connected (i.e., A and B are connected with another element or circuit interposed therebetween), the case where A and B are functionally connected (i.e., A and B are functionally connected with another circuit interposed therebetween), or the case where A and B are directly connected (i.e., A and B are connected without another element or circuit interposed therebetween).

Effect of the Invention

According to one embodiment of the present invention, the generation of a reverse current in a modulation circuit can be prevented, resulting in a reduction in the power consumption of the modulation circuit. The reduction in the power consumption of the modulation circuit makes it possible to reduce the power consumption of the whole semiconductor device having the modulation circuit. Furthermore, the reduction in the power consumption of the RF tag having the modulation circuit results in an increase in the maximum communication distance of the RF tag.

BRIEF DESCRIPTION OF DRAWINGS

In the accompanying drawings:

FIGS. 5A and 5B are circuit diagrams, each illustrating an example of a modulation circuit of one embodiment of the present invention;

BEST MODE FOR CARRYING OUT THE INVENTION

Figure 1:
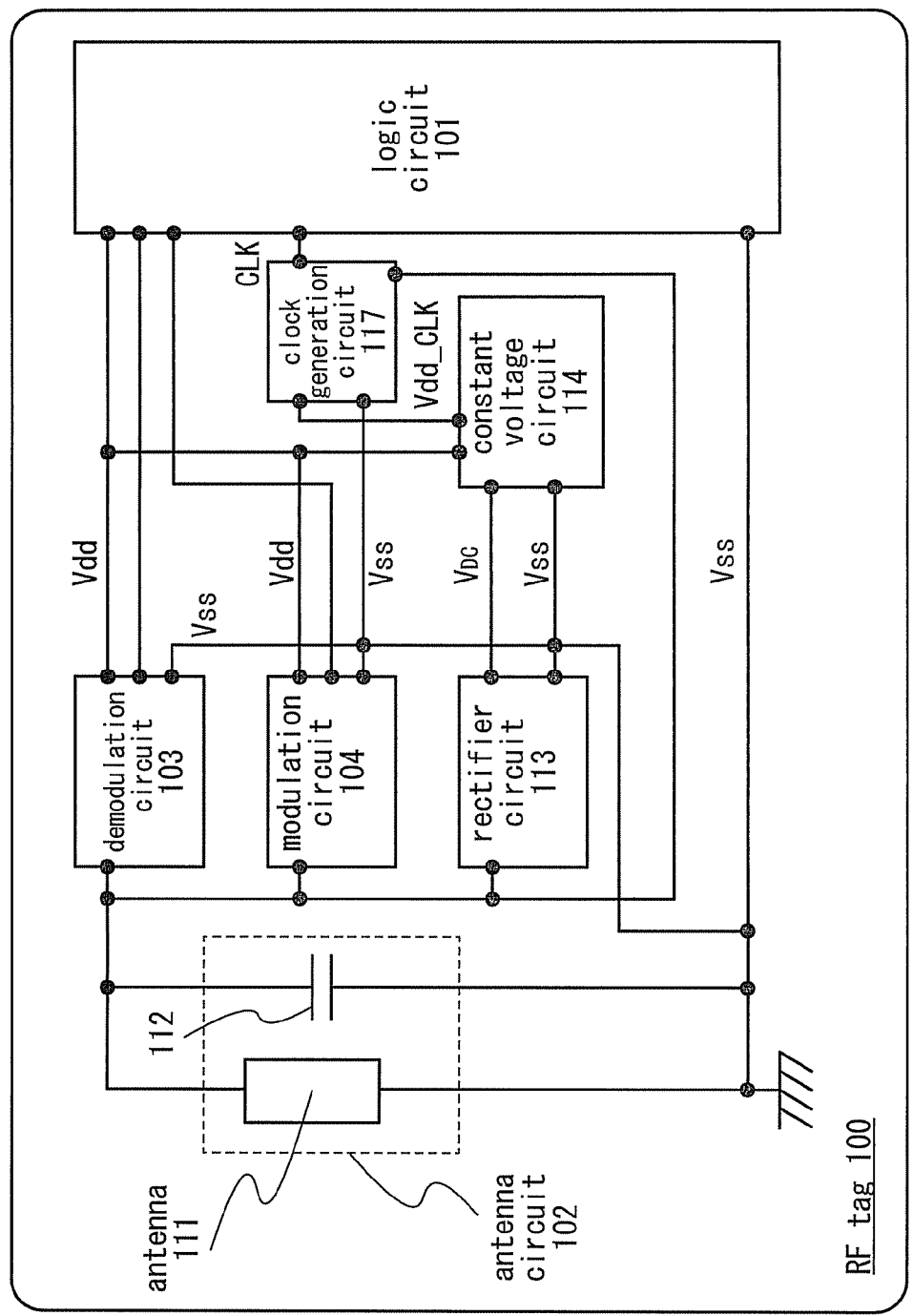
FIG. 1 is a block diagram illustrating the whole RF tag of one embodiment of the present invention.

Embodiments of the present invention will be described in detail with reference to drawings. Note that the present invention is not limited to the description below, and it will be apparent to those skilled in the art that modes and details can be modified in various ways without departing from the spirit and scope of the present invention. Accordingly, in the embodiments of the present invention described below, like portions are denoted by like reference numerals.

Furthermore, each of the embodiments and examples described below can be implemented in appropriate combination with the other embodiments and examples described in this specification unless otherwise noted.

Embodiment 1

FIG. 1 is a block diagram illustrating the whole RF tag used as one embodiment of the present invention. An RF tag 100 includes: a logic circuit 101 for carrying out functional processing such as generation of a response signal in accordance with received data; an antenna circuit 102 for transmitting and receiving (communicating) signals to and from a reader/writer; a demodulation circuit 103 for demodulating an amplitude-modulated wave (a wave obtained by overlapping a carrier wave with a modulated wave) received by the antenna circuit 102 to extract a pulsed signal; a modulation circuit 104 for modulating a carrier wave output from the reader/writer in accordance with a response signal output from the logic circuit 101 and transmitting a response signal to the reader/writer; a rectifier circuit 113 for generating a DC voltage from a carrier wave or an amplitude modulated wave received by the antenna circuit 102; a constant voltage circuit 114 for converting a DC voltage generated by the rectifier circuit 113 into a constant power supply potential; and a clock generation circuit 117.

As described above, the RF tag 100 includes a plurality of circuits needed to wirelessly communicate data with the reader/writer. Among these circuits, a configuration of the modulation circuit 104 is particularly a feature of one embodiment of the present invention. That is, the modulation circuit 104 of one embodiment of the present invention is characterized in that a diode is provided between one terminal of an antenna and a switch (e.g., a transistor). The modulation circuit 104 having such a feature can prevent generation of a reverse current, resulting in a reduction in the power consumption of the modulation circuit 104.

The antenna circuit 102 includes an antenna 111 and a resonance capacitor 112. The capability of receiving a carrier wave from the reader/writer varies depending on the shape or the like of the antenna 111; however, there is no particular limitation on the shape or the like of the antenna 111 in the present invention. The resonance capacitor 112 is combined with the antenna 111 to adjust the resonance frequency of the antenna circuit 102 to the frequency of a carrier wave from the reader/writer. Although the resonance capacitor 112 is provided in this embodiment, it is not necessarily provided; in that case, the resonance frequency may be adjusted to a carrier wave from the reader/writer only by the antenna 111.

The rectifier circuit 113 has a function of rectifying a carrier wave or an amplitude modulated wave received by the antenna circuit 102 and generating a DC voltage $V_{DC}$. The potential of a DC voltage $V_{DC}$ generated by the rectifier circuit 113 changes depending on the power which corresponds to the width of the amplitude of a carrier wave. As the power increases, the DC voltage $V_{DC}$ is made higher; as the power decreases, the DC voltage $V_{DC}$ is made lower.

The constant voltage circuit 114 has a function of converting a DC voltage $V_{DC}$ that changes depending on the power into a constant power supply potential Vdd (also referred to as a high power supply potential) and supplying the Vdd to the logic circuit 101. The logic circuit 101 operates unstably when a potential supplied to the logic circuit 101 changes; therefore, a constant potential needs to be supplied to the logic circuit 101. In this embodiment, the constant voltage circuit 114 supplies a constant power supply potential Vdd to the logic circuit 101. Note that the low power supply potential (hereinafter, referred to as $V_{SS}$) is common to each circuit in the RF tag 100, and for example, the $V_{SS}$ can be set to GND (=0 V).

The clock generation circuit 117 has a function of generating a clock signal CLK needed for the operation of the logic circuit 101 in accordance with a carrier wave or amplitude modulated wave received by the antenna circuit 102, and supplying the clock signal CLK to the logic circuit 101. As an example of the clock generation circuit 117, there is a circuit having a configuration in which a carrier wave input is converted into a rectangular wave having the same frequency as the carrier wave by an analog-digital converter, the frequency of the rectangular wave is reduced to that suitable for circuit operation (e.g., 1/16 of the frequency of the carrier wave) by a divider circuit, and the generated signal is output as a clock signal CLK. However, the clock generation circuit 117 is not limited to such a configuration.

The clock generation circuit 117 needs to have a function of stably supplying a clock signal CLK having a constant frequency to the logic circuit 101. Therefore, similarly to the logic circuit 101 described above, a constant potential needs to be supplied to the clock generation circuit 117.

As a constant potential supplied to the clock generation circuit 117, the power supply potential Vdd generated by the constant voltage circuit 114 may be used as in the logic circuit 101. However, the power supply potential Vdd is also supplied to other circuits and it may change depending on the operation of the other circuits. In that case, it is preferable that another power supply potential Vdd_CLK different from the power supply potential Vdd supplied to the other circuits be generated by the constant voltage circuit 114 and the power supply potential Vdd_CLK be supplied to the clock generation circuit 117. By employing this configuration, the clock generation circuit 117 can easily and stably supply a clock signal CLK having a constant frequency to the logic circuit 101.

Figure 2:
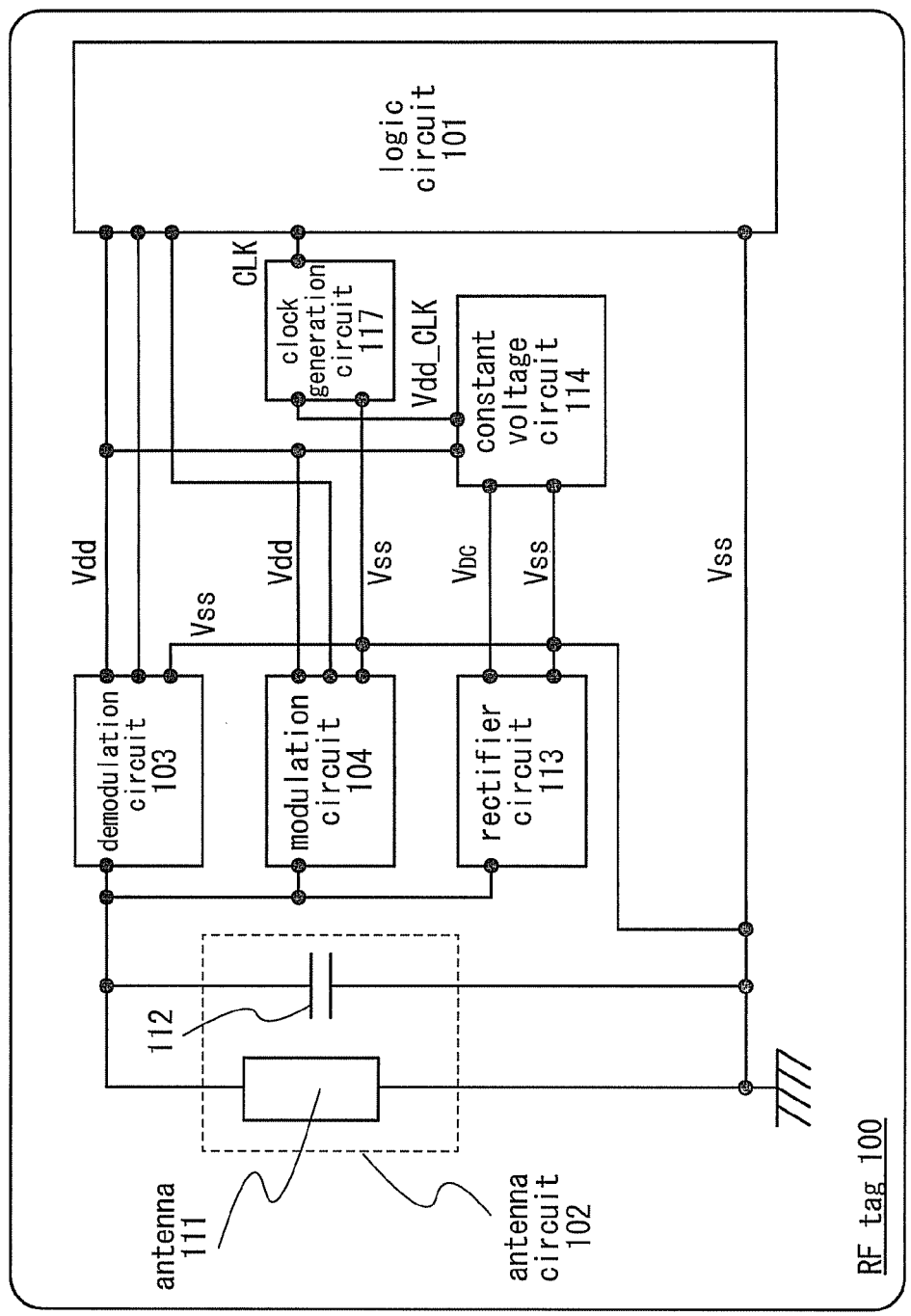
FIG. 2 is a block diagram illustrating the whole RF tag of one embodiment of the present invention.

FIG. 2 is a block diagram illustrating the whole RF tag used as one embodiment of the present invention. Differently from the clock generation circuit 117 in FIG. 1, the clock generation circuit 117 in FIG. 2 generates a clock signal CLK needed for the operation of the logic circuit 101 without accordance with a carrier wave or amplitude modulated wave received by the antenna circuit, and supplies the clock signal CLK to the logic circuit 101. An oscillation circuit such as a ring oscillator can be used as an example of such a clock generation circuit; however, the clock generation circuit is not limited to this configuration. Note that in the RF tag 100 illustrated in FIG. 2, the circuits other than the clock generation circuit 117 can be similar to those in the RF tag 100 illustrated in FIG. 1; thus, description is omitted here.

Embodiment 2

Figure 3A:
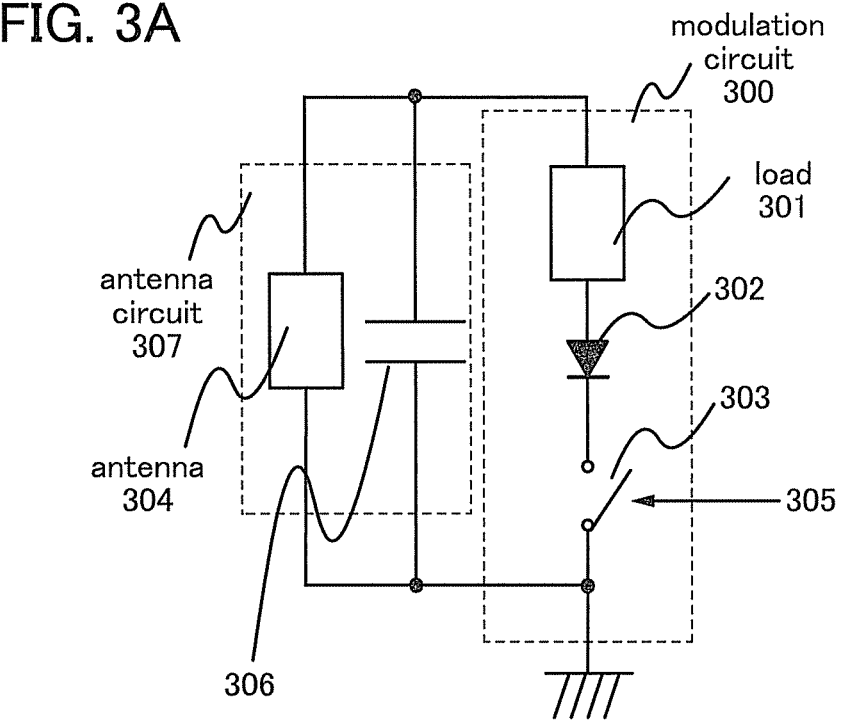
FIGS. 3A and 3B are circuit diagrams, each illustrating an example of a modulation circuit of one embodiment of the present invention.
Figure 3B:
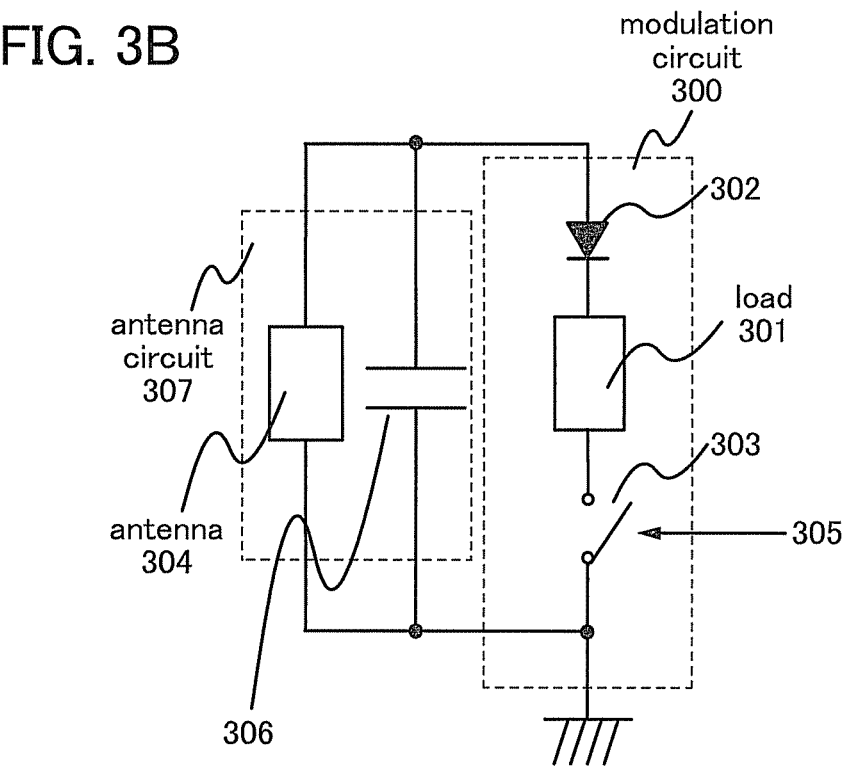

In this embodiment, a configuration and operation of the modulation circuit shown in Embodiment 1 will be described in detail. FIGS. 3A and 3B illustrate an example of a circuit configuration of the modulation circuit of one embodiment of the present invention.

First, a configuration of the modulation circuit of this embodiment will be described with reference to FIG. 3A. A modulation circuit 300 employs a load switching method and includes a load 301, a diode 302, and a switch 303. An anode (one terminal) of the diode 302 is electrically connected to one terminal of an antenna 304 via the load 301; a cathode (the other terminal) of the diode 302 is electrically connected to one terminal of the switch 303; and the other terminal of the switch 303 is electrically connected to the other terminal of the antenna 304.

Note that the antenna described in this specification is a balanced device; therefore, a sine wave with a certain frequency is input to each of the two terminals of the antenna in an RF tag. A signal at one terminal of the antenna and a signal at the other terminal of the antenna have phases shifted from each other by 180°. However, description is given below on the assumption that the potential of the other terminal of the antenna is fixed (0 V) for the sake of simplicity. Furthermore, this applies not only to this embodiment but also to the other embodiments and examples.

FIG. 3A illustrates an example in which an antenna circuit 307 includes the antenna 304 and a resonance capacitor 306; however, the present invention is not limited to this configuration. That is, the antenna circuit 307 may include only the antenna 304. This applies not only to the configuration of the antenna in this embodiment but also to the configuration of antennas in the other embodiments.

The load 301 may be a capacitor or a resistor, for example. As the switch 303, for example, a transistor can be used. The polarity of the transistor is not limited, and either a p-channel transistor or an n-channel transistor can be used. In addition, there is no particular limitation on the structure of an active layer of the transistor. For example, the active layer can be made of a semiconductor such as silicon, germanium, or silicon germanium. Also, there is no particular limitation on the crystallinity of the semiconductor, and any of an amorphous semiconductor, a microcrystalline semiconductor (also referred to as a semi-amorphous semiconductor), a polycrystalline semiconductor, and a single crystal semiconductor can be used.

As a material of the semiconductor, a compound semiconductor or an oxide semiconductor as well as the aforementioned elementary substance of silicon (Si) can be used. As an example of the compound semiconductor, GaAs, InP, SiC, ZnSe, GaN, or SiGe can be used. As an example of the oxide semiconductor, there is zinc oxide, tin oxide, magnesium zinc oxide, gallium oxide, indium oxide, or an oxide semiconductor containing some of the above oxide semiconductors. Note that as an example of the oxide semiconductor containing some of the above oxide semiconductors, an oxide semiconductor containing zinc oxide, indium oxide, and gallium oxide (an oxide semiconductor layer containing indium, gallium, and zinc) can be used.

There is no particular limitation on the kind of the diode 302, and a PN diode, a PIN diode, a Schottky barrier diode, a constant voltage diode (a zener diode), a diode-connected transistor, or the like can be used as long as a rectification effect can be obtained. For example, it is possible to use an n-channel transistor of which a gate and one of a source and a drain are diode-connected. Alternatively, a p-channel transistor of which a gate and one of a source and a drain are diode-connected may be used. It is also possible to use a transistor group including a plurality of diode-connected transistors serially connected (hereinafter, referred to as a diode-connected transistor group). In the case of using a PN diode or a PIN diode, a lateral junction PN diode or PIN diode is preferably used. This is because a lateral junction PN diode or a lateral junction PIN diode can be manufactured over the same substrate as transistors necessary for a semiconductor device such as an RF tag without changing the existing process. These various kinds of diodes can be used as appropriate not only for the diode 302 but also for the other diodes used in one embodiment of the present invention.

Next, operation of the modulation circuit of this embodiment will be described. The switch 303 is brought into an on-state (a conductive state) or an off-state (a non-conductive state) in accordance with a signal (also referred to as a subcarrier wave) from a logic circuit. As a method for modulating a signal 305 from the logic circuit, for example, an ASK (amplitude shift keying) method in which the amplitude of a carrier wave is changed can be used.

First, when the switch 303 is in an off-state, almost no current flows from the one terminal of the antenna 304 to the other terminal of the antenna 304 via the load 301 and the diode 302; thus, Therefore, the potential of a terminal of an antenna 304 is practically not influenced by the modulation circuit. Accordingly, the impedance between the two terminals of the antenna 304 does not change either.

On the other hand, when the switch 303 is in an on-state and the potential of the one terminal of the antenna 304 has a positive potential, a forward current flows from the one terminal of the antenna 304 to the other terminal of the antenna 304 via the load 301 and the diode 302. As the forward current flows, the potential of the one terminal of the antenna 304 changes and the impedance between the two terminals of the antenna 304 also changes.

When the switch 303 is in an on-state and the potential of the one terminal of the antenna 304 has a negative potential, the potential of the other terminal of the antenna 304 (0 V) is higher than that of the one terminal of the antenna 304 (a negative value). However, in this embodiment, the one terminal of the antenna 304 is electrically connected to the anode of the diode 302 via the load 301 and the other terminal of the antenna 304 is electrically connected to the cathode of the diode 302; which can prevent a reverse current from flowing from the other terminal of the antenna 304 to the one terminal of the antenna 304. Thus, in the modulation circuit 300 of this embodiment, wasteful power consumption of the switch 303 can be suppressed by providing the diode 302 between the one terminal of the antenna 304 and the switch 303.

In addition, the RF tag can operate with lower power consumption than conventional RF tags because the reverse current of the modulation circuit 300 is reduced by providing the diode 302, which results in an increase in the maximum communication distance of the RF tag. The reason can be explained as follows.

As illustrated in FIG. 1 described in Embodiment 1, the antenna circuit 102 is electrically connected to the demodulation circuit 103 and the rectifier circuit 113 in addition to the modulation circuit 104. Accordingly, as the reverse current of the modulation circuit 300 decreases, the amount of current supplied to the demodulation circuit 103 and the rectifier circuit 113 increases depending on the amount of reduction of the reverse current. When the amount of current supplied to the rectifier circuit 113 increases, the amount of DC voltage generated by the rectifier circuit 113 also increases. Therefore, the RF tag 100 can operate even when the power supplied from the reader/writer via the antenna circuit 102 is smaller than that in conventional RF tags. Thus, the amount of power needed for operation of the RF tag 100 can be reduced as compared to that in conventional RF tags, resulting in an increase in the maximum communication distance of the RF tag 100.

Note that even though the diode 302 is provided between the load 301 and the switch 303 in this embodiment, the present invention is not limited to this configuration. That is, as illustrated in FIG. 3B, the diode 302 may be provided between the load 301 and the one terminal of the antenna 304.

Embodiment 3

This embodiment shows another configuration of the modulation circuit described in Embodiment 2, in which a resistor is used as the load 301; a diode-connected transistor is used as the diode 302; and a transistor is used as the switch 303. Note that a diode-connected n-channel transistor is used as the diode 302 in this embodiment; however, the polarity of the diode-connected transistor is not limited as described in Embodiment 2. Furthermore, an n-channel transistor is used as the switch 303 in this embodiment; however, the polarity of the transistor is not limited as described in Embodiment 2.

Figure 4A:
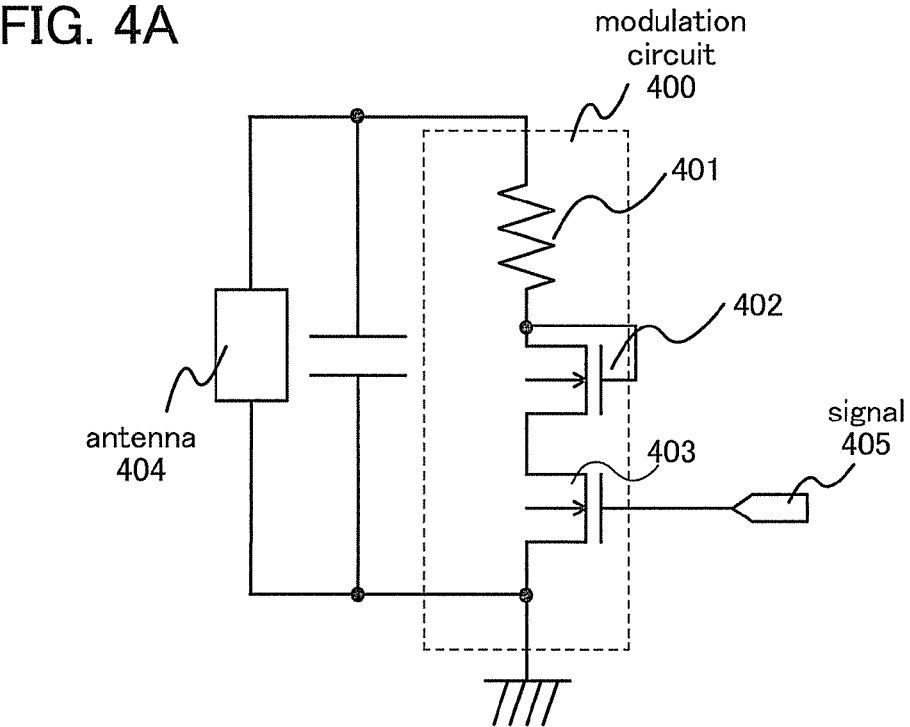
FIGS. 4A and 4B are circuit diagrams, each illustrating an example of a modulation circuit of one embodiment of the present invention.
Figure 6:
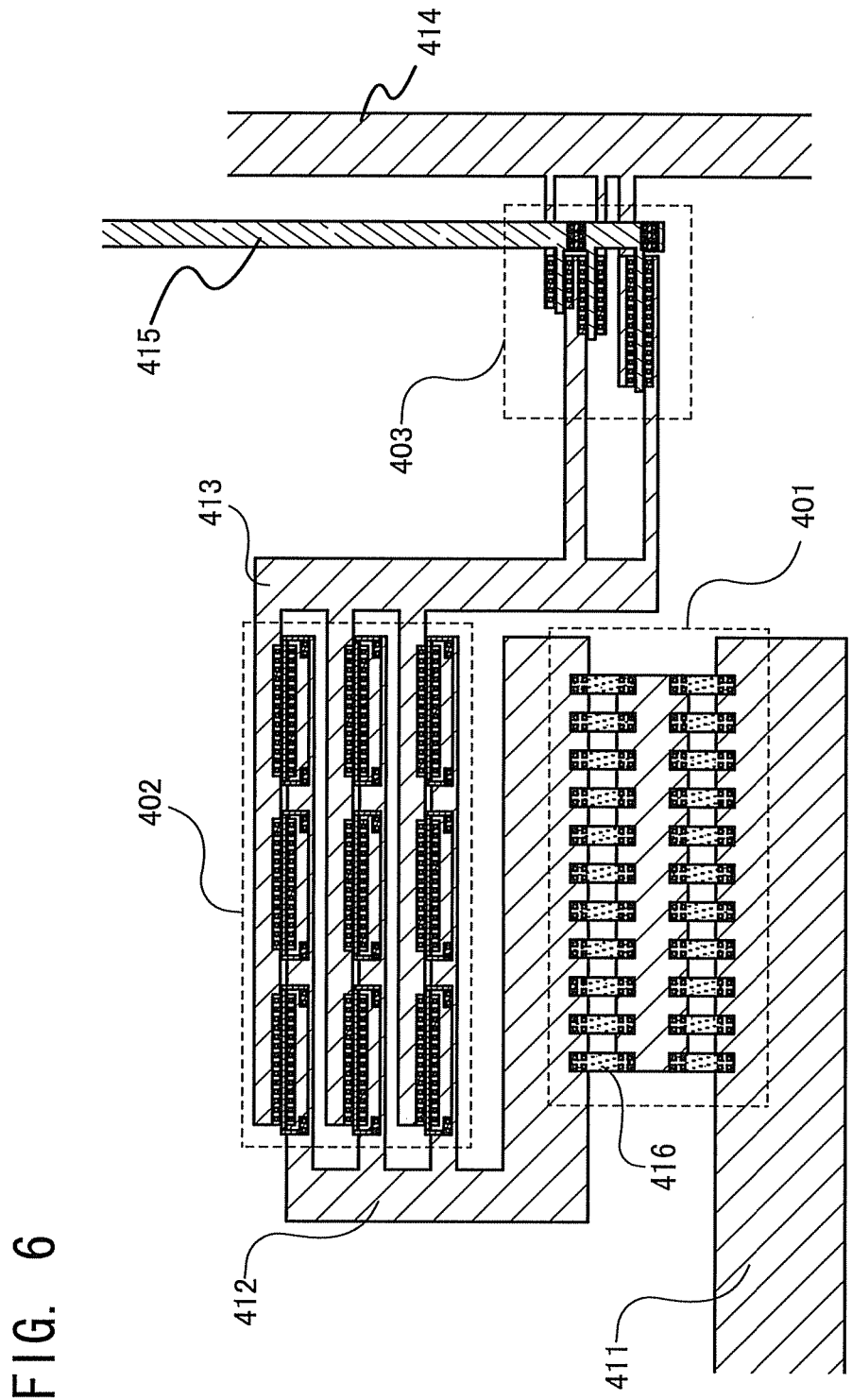
FIG. 6 is a top view (a layout) illustrating an example of a modulation circuit of one embodiment of the present invention.

FIG. 4A illustrates a circuit configuration of the modulation circuit of this embodiment. A modulation circuit 400 employs a load switching method and includes a resistor 401, a diode-connected n-channel transistor 402 (hereinafter, referred to as a diode-connected transistor 402), and a transistor 403. One of a source and a drain of the diode-connected transistor 402 and a gate thereof are electrically connected to one terminal of an antenna 404 via the resistor 401; the other of the source and the drain of the diode-connected transistor 402 is electrically connected to one of a source and a drain of the transistor 403; and the other of the source and the drain of the transistor 403 is electrically connected to the other terminal of the antenna 404. FIG. 6 illustrates an example of a layout (a top view) of the modulation circuit 400 having such a configuration.

FIG. 6 illustrates a layout in which the resistor 401, the diode-connected transistor 402, and the transistor 403 are connected to each other through wirings. FIG. 6 also illustrates wirings for connecting each element, such as a wiring 411 for electrically connecting one terminal of the antenna 404 to one terminal of the resistor 401, a wiring 412 for electrically connecting the other terminal of the resistor 401 to one of the source and the drain of the diode-connected transistor 402, a wiring 413 for electrically connecting the other of the source and the drain of the diode-connected transistor 402 to one of the source and the drain of the transistor 403, a wiring 414 for electrically connecting the other of the source and the drain of the transistor 403 to the other terminal of the antenna 404, and a wiring (a gate wiring) 415 through which a signal 405 is input from the logic circuit to a gate of the transistor 403. The resistor 401 is made of silicon 416 containing an impurity such as phosphorus.

Next, operation of the modulation circuit 400 will be described. The signal (the binary signal) 405 is input from the logic circuit to the gate of the transistor 403. When the signal 405 input from the logic circuit to the gate is High (H), the transistor 403 is turned on (brought into conduction), and when the signal 405 is Low (L), the transistor 403 is turned off (brought out of conduction).

First, when the transistor 403 is in an off-state, almost no current flows from the one terminal of the antenna 404 to the other terminal of the antenna 404 via the resistor 401 and the diode-connected transistor 402; thus, the potential of a terminal of an antenna is practically not influenced by the modulation circuit. Accordingly, the impedance between the two terminals of the antenna 404 does not change either.

On the other hand, when the transistor 403 is in an on-state and the potential of the one terminal of the antenna 404 has a positive potential, a forward current flows from the one terminal of the antenna 404 to the other terminal of the antenna 404 via the resistor 401 and the diode-connected transistor 402. As the forward current flows, the potential of the one terminal of the antenna 404 changes and the impedance between the two terminals of the antenna 404 also changes.

When the transistor 403 is in an on-state and the potential of the one terminal of the antenna 404 has a negative potential, the potential of the other terminal of the antenna 404 (0 V) is higher than that of the one terminal of the antenna 404 (a negative value). However, the diode-connected transistor 402 is provided in this embodiment; therefore, a reverse current can be prevented from flowing from the other terminal of the antenna 404 to the one terminal of the antenna 404. That is, when the one terminal of the antenna 404 has a negative potential, the one terminal of the antenna 404 is electrically connected to the source of the diode-connected transistor 402 via the resistor 401. At this time, no current flows through the diode-connected transistor 402 because the source and the gate thereof are electrically connected to each other (i.e., Vgs=0V). Thus, in the modulation circuit 400 of this embodiment, wasteful power consumption of the transistor 403 can be suppressed by providing the diode-connected transistor 402 between the one terminal of the antenna 404 and the transistor 403.

Figure 4B:
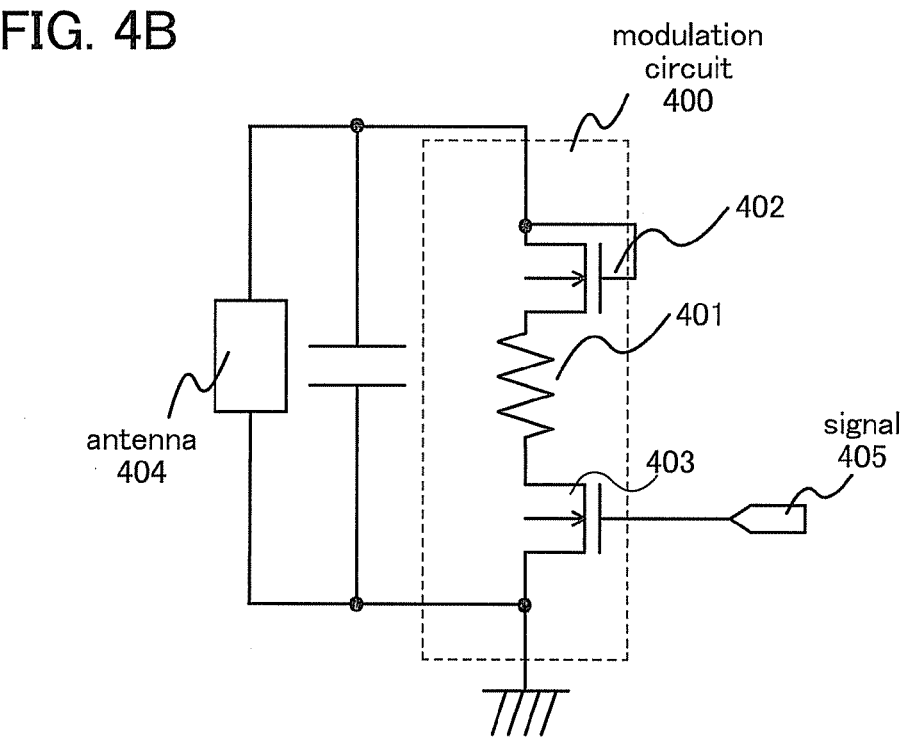

Note that even though the diode-connected transistor 402 is provided between the resistor 401 and the transistor 403 in this embodiment, the present invention is not limited to this configuration. That is, as illustrated in FIG. 4B, the diode-connected transistor 402 may be provided between the resistor 401 and the one terminal of the antenna 404.

Embodiment 4

This embodiment shows another configuration of the modulation circuit described in Embodiment 2, in which a capacitor is used as the load 301; a diode-connected transistor is used as the diode 302; and a transistor is used as the switch 303. Note that a diode-connected n-channel transistor is used as the diode 302 in this embodiment; however, the polarity of the diode-connected transistor is not limited as described in Embodiment 2. Furthermore, an n-channel transistor is used as the switch 303 in this embodiment; however, the polarity of the transistor is not limited as described in Embodiment 2. Thus, the modulation circuit described in this embodiment can be regarded to be the same as that in Embodiment 3 except a capacitor is substituted for the resistor 401.

FIGS. 5A and 5B illustrate circuit configurations of the modulation circuit of this embodiment. A modulation circuit 500 employs a load switching method and includes a capacitor 501, a diode-connected n-channel transistor 502 (hereinafter, referred to as a diode-connected transistor 502), and a transistor 503. One of a source and a drain of the diode-connected transistor 502 and a gate thereof are electrically connected to one terminal of an antenna 504 via the capacitor 501; the other of the source and the drain of the diode-connected transistor 502 is electrically connected to one of a source and a drain of the transistor 503; and the other of the source and the drain of the transistor 503 is electrically connected to the other terminal of the antenna 504. One electrode of the capacitor 501 is electrically connected to the one terminal of the antenna 504, and the other electrode of the capacitor 501 is electrically connected to one of the source and the drain of the diode-connected transistor 502 and the gate thereof.

Next, operation of the modulation circuit 500 will be described. A signal (a binary signal) 505 is input from the logic circuit to the gate of the transistor 503. When the signal 505 input from the logic circuit to the gate is High (H), the transistor 503 is turned on (brought into conduction), and when the signal 505 is Low (L), the transistor 503 is turned off (brought out of conduction).

First, when the transistor 503 is in an off-state, the amount of charge stored in the other electrode of the capacitor 501 hardly changes; therefore, the potential of the one terminal of the antenna 504, which is electrically connected to the one electrode of the capacitor 501, does not change. Accordingly, the impedance between the two terminals of the antenna 504 does not change either.

On the other hand, when the transistor 503 is in an on-state and the one terminal of the antenna 504 has a positive potential, part of the charge stored in the other electrode of the capacitor 501 is discharged to the ground; therefore, the potential of the one terminal of the antenna 504, which is electrically connected to the one electrode of the capacitor 501, changes. As a result, the impedance between the two terminals of the antenna 504 changes.

When the transistor 503 is in an on-state and the potential of the one terminal of the antenna 504 has a negative potential, the potential of the other terminal of the antenna 504 (0 V) is higher than that of the one terminal of the antenna 504 (a negative value). However, the diode-connected transistor 502 is provided in this embodiment; therefore, the amount of charge stored in the other electrode of the capacitor 501 does not change. Thus, in the modulation circuit 500 of this embodiment, wasteful power consumption of the transistor 503 can be suppressed by providing the diode-connected transistor 502 between the one terminal of the antenna 504 and the transistor 503.

Note that even though the diode-connected transistor 502 is provided between the capacitor 501 and the transistor 503 in this embodiment, the present invention is not limited to this configuration. That is, as illustrated in FIG. 5B, the diode-connected transistor 502 may be provided between the capacitor 501 and the one terminal of the antenna 504.

Embodiment 5

A semiconductor device such as an RF tag includes a semiconductor integrated circuit that is provided with a plurality of minute semiconductor elements. The modulation circuit of one embodiment of the present invention is also provided with semiconductor elements; therefore, malfunction of the circuit due to electrostatic discharge (ESD) applied from the outside or damage of the semiconductor elements easily occurs. In particular, electrostatic discharge is most likely to occur in an RF tag having an antenna which is a conductor with a large surface area. This embodiment shows an example of a structure of a semiconductor integrated circuit which is protected against such electrostatic discharge.

FIGS. 7A to 7D illustrate examples of the structure. In this embodiment, a shield containing a conductive material is provided near a semiconductor integrated circuit, thereby protecting the semiconductor integrated circuit. Note that the shield can be formed by a dry process such as sputtering, plasma CVD, or evaporation, or a wet process such as coating, printing, or droplet discharging (ink-jet).

Figure 7A:
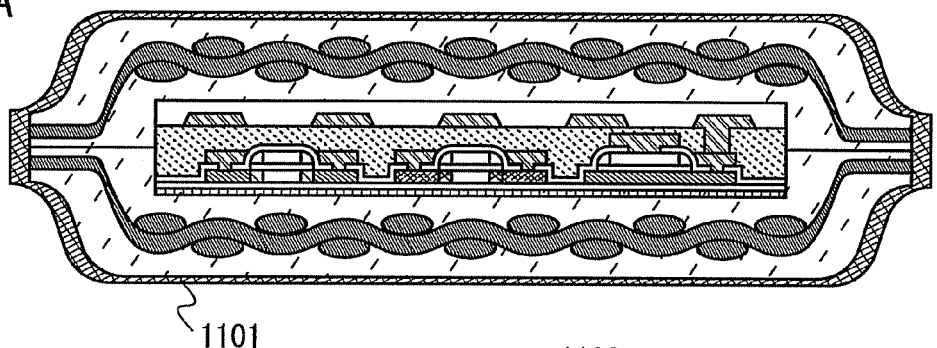
FIGS. 7A to 7D are cross-sectional views, each illustrating an example of a structure in which countermeasures against static electricity are implemented for an RF tag of one embodiment of the present invention.

FIG. 7A illustrates an example in which a shield 1101 is provided to cover the entire outside of a semiconductor integrated circuit chip. The shield 1101 may be formed to a thickness that prevents, as much as possible, blocking of the reception of a carrier wave or an amplitude modified wave transmitted from a reader/writer by an antenna.

In FIG. 7A, the shield 1101 is formed to cover the top surface, bottom surface, and side surfaces of the semiconductor integrated circuit chip. The shield 1101 may be formed in the following manner: after the shield is formed on the top surface and a part of the side surfaces, the semiconductor integrated circuit is turned over and the shield is conned on the bottom surface and the other part of the side surfaces, thereby covering the entire surface of the semiconductor integrated circuit.

Figure 7B:
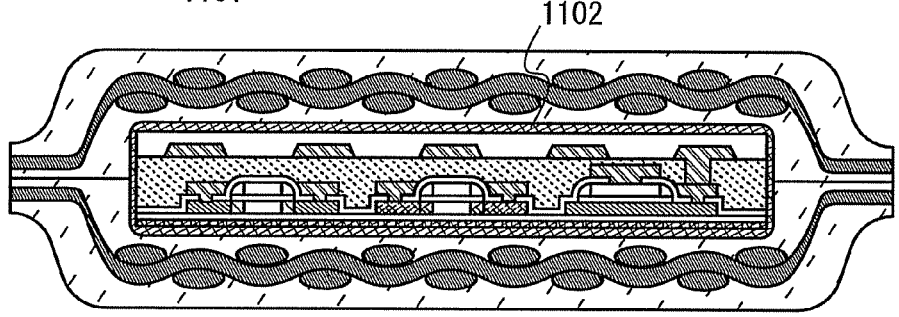

FIG. 7B illustrates an example in which a shield 1102 is provided inside an insulator to cover the entire surface of a semiconductor integrated circuit. In order to form the shield 1102 so that it covers the entire surface of the semiconductor integrated circuit, the semiconductor integrated circuit needs to be divided into each semiconductor integrated circuit chip and then covered by the shield 1102 before being sandwiched and sealed between insulators. However, the present invention is not particularly limited to this method. For example, the shield may be formed on the top surface and bottom surface of the semiconductor integrated circuit before the semiconductor integrated circuit is sandwiched and sealed between insulators, and then the semiconductor integrated circuit may be divided by laser light irradiation, so that the shield can be melted on divided surfaces to cover the side surfaces of the semiconductor integrated circuit chip.

Figure 7C:
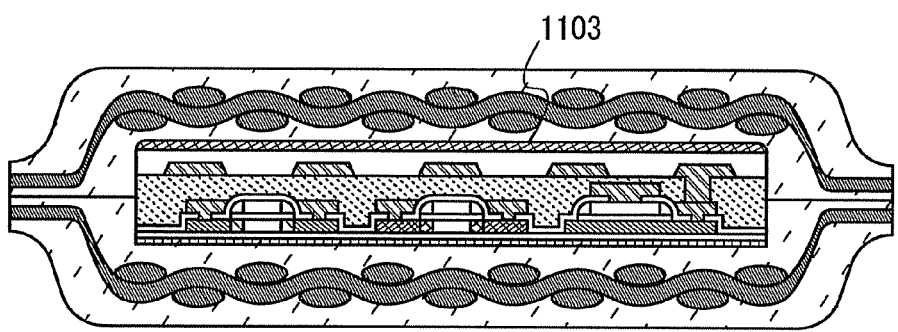

FIG. 7C illustrates an example in which a shield 1103 is provided inside an insulator and only on one surface of a semiconductor integrated circuit. In this example, the shield 1103 is formed on a surface on which an antenna is provided; however, the shield 1103 may be formed on the opposite surface.

When the shield is formed only on one surface of the semiconductor integrated circuit, a carrier wave or an amplitude modulated wave transmitted from a reader/writer can be received by the antenna without being blocked by the shield. Thus, communication can be performed with high accuracy.

Figure 7D:
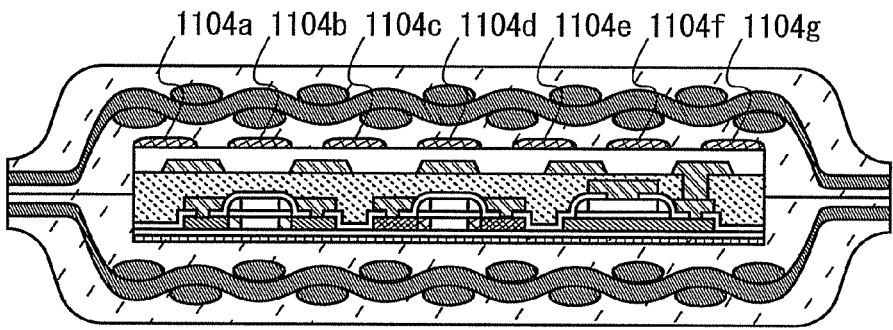
Figure 8A:
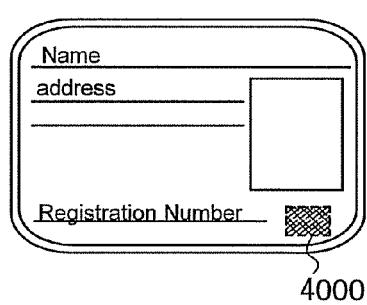
FIGS. 8A to 8F are views illustrating application examples of an RF tag of one embodiment of the present invention.
Figure 8B:
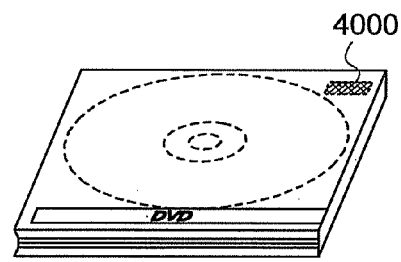
Figure 8C:
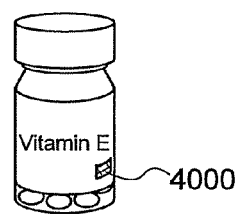
Figure 8D:
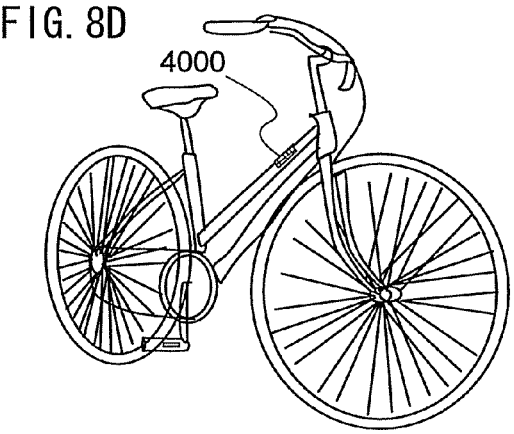
Figure 8E:
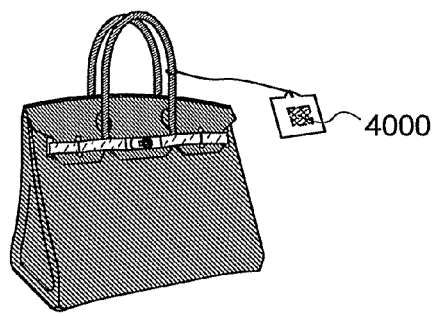
Figure 8F:
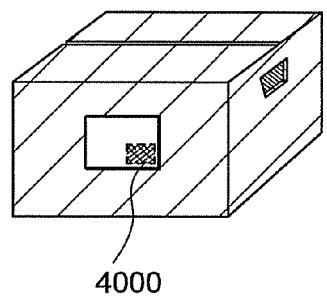

Although FIGS. 7A to 7C illustrate an example in which the shield is formed as a film using a conductive material, island-like shields 1104a to 1104g may be formed as illustrated in FIG. 7D. Each of the shields 1104a to 1104g is made of a conductive material and has conductivity. However, since the shields 1104a to 1104g are separately formed, for example, the shields 1104a and 1104b, or the shields 1104c and 1104g are not electrically connected to each other. That is, although each of the shields 1104a to 1104g has conductivity, the shields 1104a to 1104g as a whole can be regarded as a film equivalent to an insulator. Such a structure of the shields can protect a semiconductor integrated circuit against electrostatic discharge, because each of the shields 1104a to 1104g has conductivity. At the same time, since the shields 1104a to 1104g as a whole can be regarded as a film equivalent to an insulator, a carrier wave or an amplitude modulated wave transmitted from a reader/writer can be received by an antenna without being blocked by the shields. Thus, communication can be performed with high accuracy.

The shields illustrated in FIGS. 7A to 7D are preferably made of a conductor or a semiconductor, and for example, a metal film, a metal oxide film, a semiconductor film, or a metal nitride film can be used. Specifically, the shields can be made of an element selected from titanium, molybdenum, tungsten, aluminum, copper, silver, gold, nickel, platinum, palladium, iridium, rhodium, tantalum, cadmium, zinc, iron, silicon, germanium, zirconium, or barium; or an alloy material, a compound material, a nitride material, an oxide material, or the like, which contains any of the above elements as a main component.

As the nitride material, tantalum nitride, titanium nitride, or the like can be used.

As the oxide material, indium tin oxide (ITO), indium tin oxide containing silicon oxide (ITSO), organoindium, organotin, zinc oxide, or the like can be used. Alternatively, indium zinc oxide (IZO) containing zinc oxide (ZnO), zinc oxide (ZnO), zinc oxide containing gallium (Ga), tin oxide ($SnO_2$), indium oxide containing tungsten oxide, indium zinc oxide containing tungsten oxide, indium oxide containing titanium oxide, indium tin oxide containing titanium oxide, or the like may be used.

Alternatively, the shields can be made of a semiconductor film having conductivity, which is obtained by adding an impurity element or the like to a semiconductor, or the like. For example, a polycrystalline silicon film doped with an impurity element such as phosphorus can be used.

Further, as a material for the shields, a conductive macromolecule (also referred to as a conductive polymer) may be used. As the conductive macromolecule, a so-called π-electron conjugated conductive polymer can be used. For example, polyaniline and/or a derivative thereof, polypyrrole and/or a derivative thereof, polythiophene and/or a derivative thereof, and a copolymer of two or more kinds of those materials can be used.

Specific examples of a conjugated conductive polymer are given below: polypyrrole, poly(3-methylpyrrole), poly(3-butylpyrrole), poly(3-octylpyrrole), poly(3-decylpyrrole), poly(3,4-dimethylpyrrole), poly(3,4-dibutylpyrrole), poly(3-hydroxypyrrole), poly(3-methyl-4-hydroxypyrrole), poly(3-methoxypyrrole), poly(3-ethoxypyrrole), poly(3-octoxypyrrole), poly(3-carboxylpyrrole), poly(3-methyl-4-carboxylpyrrole), polyN-methylpyrrole, polythiophene, poly(3-methylthiophene), poly(3-butylthiophene), poly(3-octylthiophene), poly(3-decylthiophene), poly(3-dodecylthiophene), poly(3-methoxythiophene), poly(3-ethoxythiophene), poly(3-octoxythiophene), poly(3-carboxylthiophene), poly(3-methyl-4-carboxylthiophene), poly(3,4-ethylenedioxythiophene), polyaniline, poly(2-methylaniline), poly(2-octylaniline), poly(2-isobutylaniline), poly(3-isobutylaniline), poly(2-anilinesulfonic acid), and poly(3-anilinesulfonic acid).

An organic resin or a dopant (a halogen, a Lewis acid, an inorganic acid, an organic acid, a transition metal halide, an organic cyano compound, a nonionic surfactant, or the like) may be contained in the shields containing a conductive macromolecule.

When the RF tag including the modulation circuit of one embodiment of the present invention employs the structure in which a shield containing a conductive material is provided near a semiconductor integrated circuit, the reliability of the RF tag can be improved.

Embodiment 6

In this embodiment, application examples of an RF tag including the modulation circuit of one embodiment of the present invention will be described with reference to FIGS. 8A to 8F. The RF tag is widely used and can be provided for, for example, products such as bills, coins, securities, bearer bonds, documents (e.g., driver's licenses or resident's cards, see FIG. 8A), packaging containers (e.g., wrapping paper or bottles, see FIG. 8C), recording media (e.g., DVD software or video tapes, see FIG. 8B), vehicles (e.g., bicycles, see FIG. 8D), personal belongings (e.g., bags or glasses), foods, plants, animals, human bodies, clothing, household goods, and electronic appliances (e.g., liquid crystal display devices, EL display devices, television sets, or cellular phones), or tags on products (see FIGS. 8E and 8F).

An RF tag 4000 is fixed to a product by being mounted on a printed wiring board, attached to a surface thereof, or embedded therein. For example, the RF tag 4000 is fixed to each product by being embedded in paper of a book, or embedded in an organic resin of a package. Since the RF tag 4000 can be reduced in size, thickness, and weight, it can be fixed to a product without spoiling the design of the product. Further, bills, coins, securities, bearer bonds, documents, or the like can have an identification function by being provided with the RF tag 4000, and the identification function can be utilized to prevent counterfeiting. Moreover, the efficiency of a system such as an inspection system can be improved by providing the RF tag for packaging containers, recording media, personal belongings, foods, clothing, household goods, electronic appliances, or the like. Vehicles can also have higher security against theft or the like by being provided with the RF tag of one embodiment of the present invention.

As described above, the RF tag including the modulation circuit of one embodiment of the present invention can be used for various applications, whereby the product can be identified with a longer communication distance than in the case of using conventional RF tags.

Example 1

In this example, the electrical properties of an RF tag using the modulation circuit of one embodiment of the present invention will be described.

Figure 9:
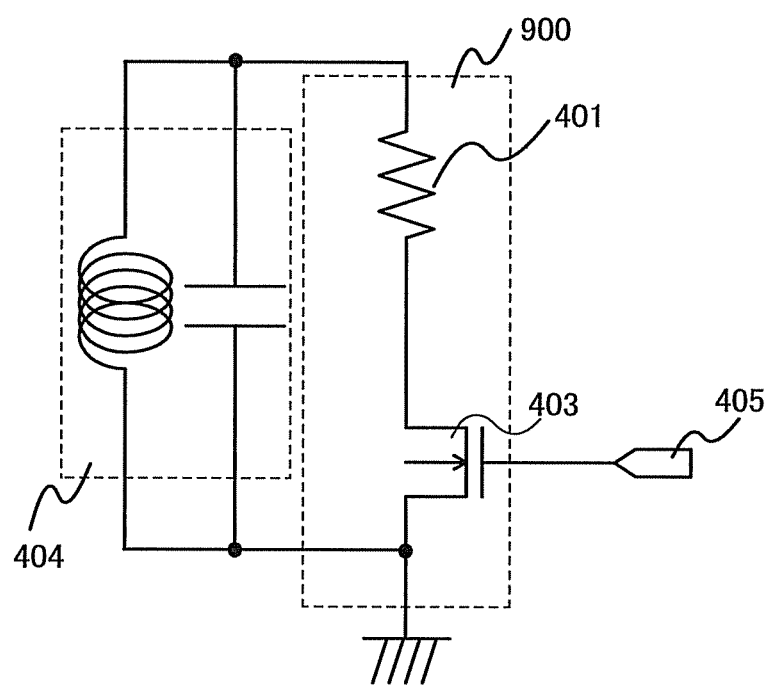
FIG. 9 is a circuit diagram illustrating a modulation circuit of a comparative example.

As the modulation circuit of one embodiment of the present invention, the modulation circuit 400 described in Embodiment 3 with reference to FIG. 4A was used. FIG. 9 is a circuit diagram illustrating a configuration of a modulation circuit 900 of a comparative example, which is different from that of the modulation circuit 400 illustrated in FIG. 4A in that the diode-connected transistor 402 is not provided. An RF tag used for the measurement includes a rectifier circuit, a logic circuit, and the like in addition to the modulation circuit. An RF tag of one embodiment of the present invention and an RF tag of a comparative example have a similar circuit configuration except for the modulation circuit.

Next, a method for calculating the current consumption of each of the rectifier circuit and the modulation circuit is described. Power corresponding to a carrier wave from a reader/writer was input via an antenna of the RF tag, and the current consumed by each of the rectifier circuit and the modulation circuit (the current consumption) was calculated by high frequency circuit simulation. Note that the calculation was performed on the assumption that a High (H) signal is input to a gate of a transistor in the modulation circuit so that the transistor is always in a conductive state (an on-state).

Figure 11:
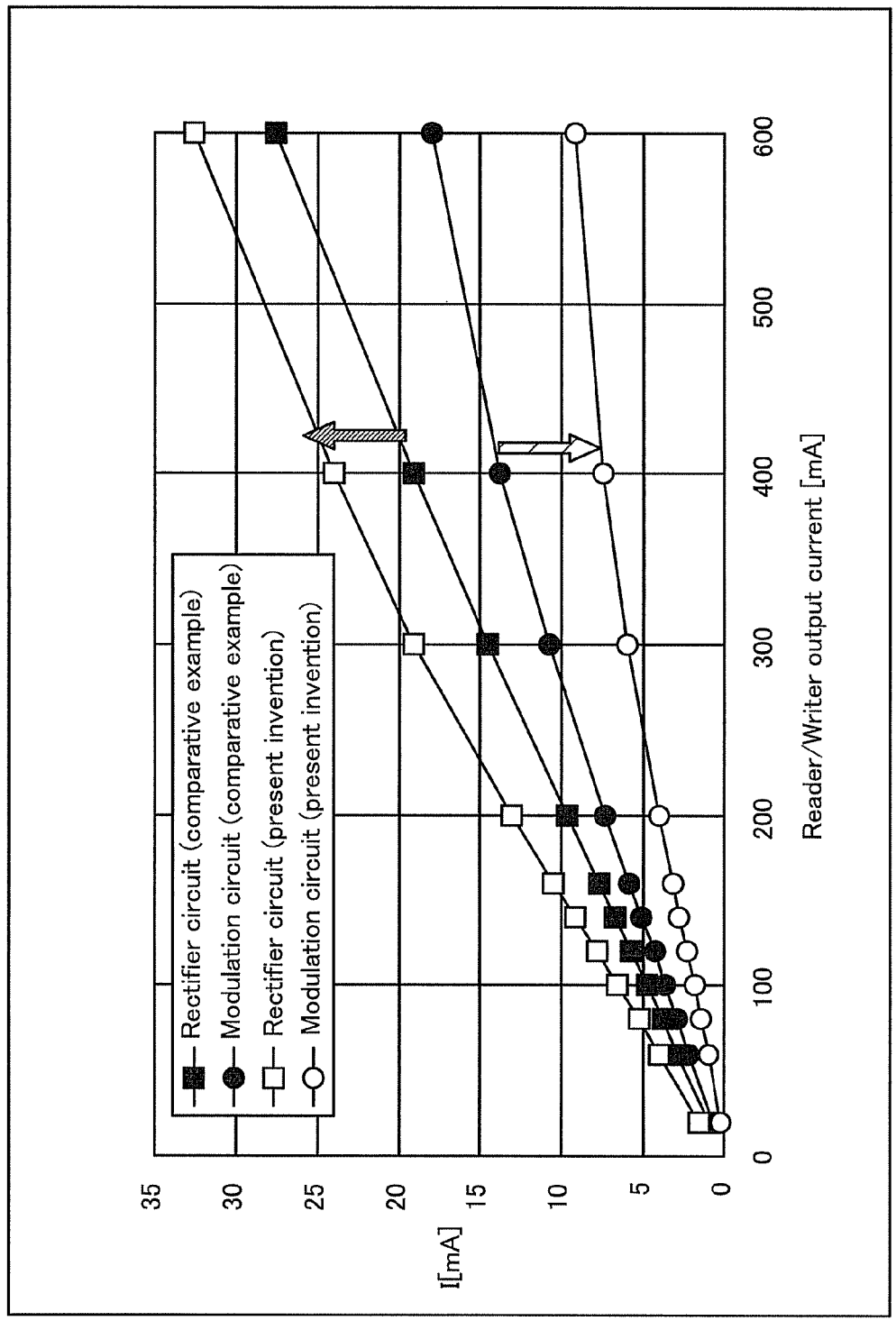
FIG. 11 is a graph comparing the current consumption of a modulation circuit and a rectifier circuit of one embodiment of the present invention with the current consumption of a modulation circuit and a rectifier circuit of a comparative example.

FIG. 11 shows the result of calculation of the current consumption of the rectifier circuit and the modulation circuit in the RF tag of one embodiment of the present invention with respect to the current output from the reader/writer, and the result of calculation of the current consumption of the rectifier circuit and the modulation circuit in the RF tag of the comparative example with respect to the current output from the reader/writer. As for the simulation conditions, the current output from the reader/writer, which is a parameter corresponding to the power output from the reader/writer, is changed from 20 mA to 1000 mA.

As shown in FIG. 11, for a same current output from the reader/writer, the current consumption of the modulation circuit in the RF tag of one embodiment of the present invention is smaller than that of the modulation circuit in the RF tag of the comparative example. On the other hand, still for a same current output from the reader/writer, the current consumption of the rectifier circuit in the RF tag of one embodiment of the present invention is larger than that of the rectifier circuit in the RF tag of the comparative example. It was thus found that since the RF tag of one embodiment of the present invention used the modulation circuit including a diode, the current consumption of the modulation circuit decreased and the current consumption of the rectifier circuit increased as compared to the case of using the modulation circuit of the comparative example. When the current consumption of the rectifier circuit increases, a DC voltage generated by the rectifier circuit increases.

Figure 12:
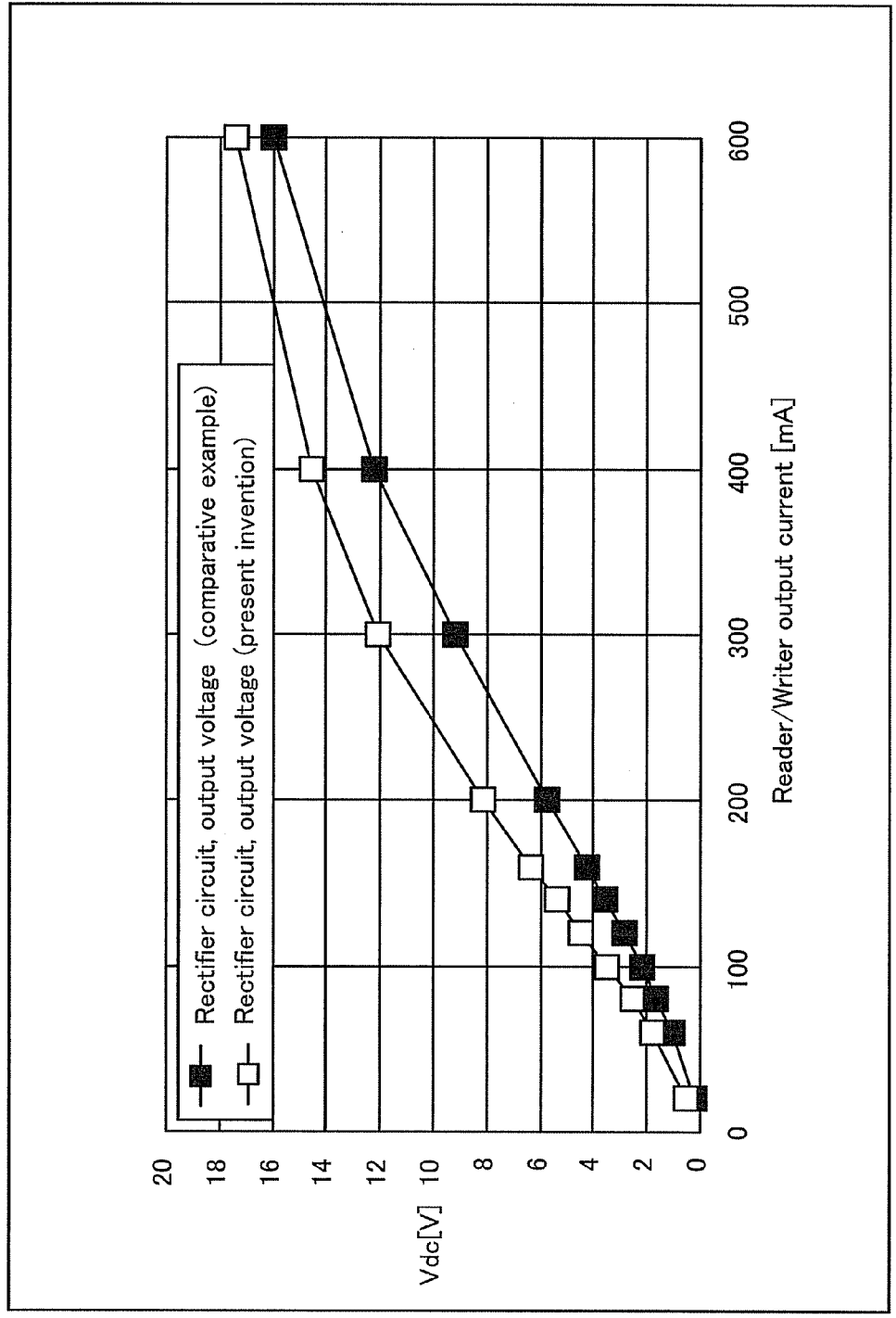
FIG. 12 is a graph comparing a DC voltage generated by a rectifier circuit of one embodiment of the present invention with a DC voltage generated by a rectifier circuit of a comparative example.

FIG. 12 shows the result of calculation of a DC voltage $V_{DC}$ generated by the rectifier circuit. It was found that when the current output from the reader/writer was the same, a DC voltage generated by the rectifier circuit in the RF tag of one embodiment of the present invention was higher than that of the rectifier circuit in the RF tag of the comparative example.

As shown in the above results, since the RF tag of one embodiment of the present invention uses the modulation circuit including a diode, a reverse current can be prevented from being generated in the modulation circuit, resulting in a reduction in the current consumption of the modulation circuit. As a result, the current consumption of the rectifier circuit (i.e., the amount of current supplied to the rectifier circuit) can be increased. Furthermore, the increase in the current consumption of the rectifier circuit makes it possible to increase the DC voltage generated by the rectifier circuit. In other words, the maximum communication distance of the RF tag of one embodiment of the present invention can be made longer than that of the RF tag of the comparative example.

Example 2

In this example, the response properties of an RF tag using the modulation circuit of one embodiment of the present invention will be described.

The RF tag used in this example has a frequency of 953 MHz and is based on EPCglobal Class-1 Generation-2. The RF tag described in this example has a circuit configuration similar to that described in Example 1. The RF tag of this example includes the modulation circuit of one embodiment of the present invention illustrated in FIG. 4A and the RF tag of a comparative example includes the modulation circuit illustrated in FIG. 9.

Figure 10:
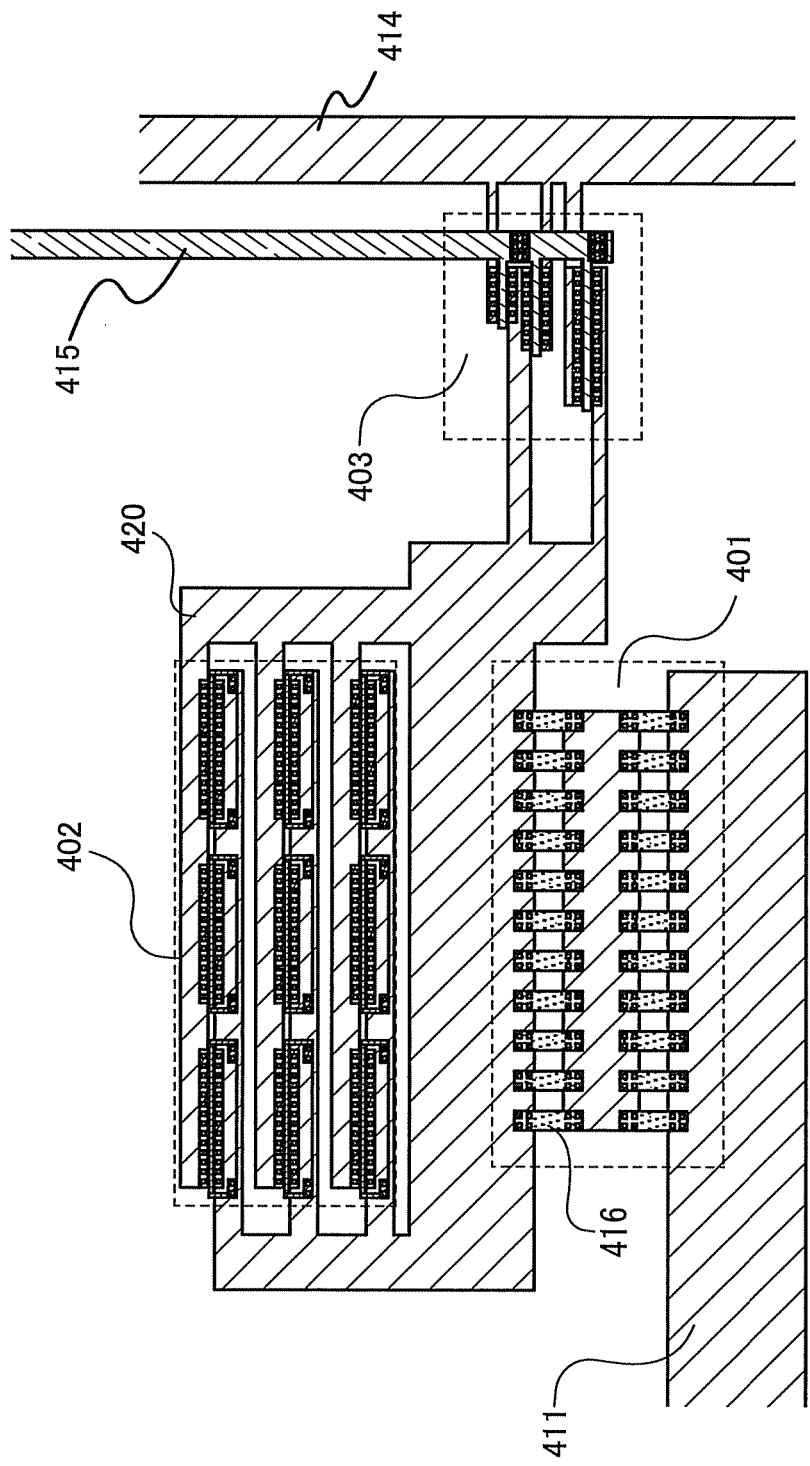
FIG. 10 is a top view (a layout) illustrating a modulation circuit of a comparative example.

FIG. 6 is a top view of the modulation circuit of one embodiment of the present invention, which is used in this example, and FIG. 10 is a top view of the modulation circuit in the RF tag of a comparative example. Description on FIG. 6 was made in Embodiment 3, and thus is omitted here. On the other hand, the layout of FIG. 10 is similar to that of FIG. 6, except a wiring 420 corresponding to a combination of the wiring 412 and the wiring 413 is provided. In the modulation circuit in the RF tag of the comparative example illustrated in FIG. 10, the source and the drain of the diode-connected transistor 402 are short-circuited. Accordingly, the modulation circuit of the comparative example as an equivalent circuit can be considered to have a configuration without the diode 402. That is, the resistor 401 and the transistor 403 can be regarded as being connected to each other directly, without being connected via the diode-connected transistor 402.

In terms of a method for manufacturing the RF tag, the RF tag of one embodiment of the present invention and the RF tag of the comparative example can be manufactured at the same time over the same substrate without changing the mask. That is, in order to obtain the RF tag illustrated in FIG. 6, the RF tag illustrated in FIG. 10 is manufactured and the wiring 420 in FIG. 10 is divided, so that the wiring 412 and the wiring 413 in FIG. 6 can be formed. The wiring 420 can be divided by, for example, laser scribing. In this manner, the two kinds of RF tags having different modulation circuits can be easily manufactured over the same substrate only by adding a step of dividing the wiring 420.

Next, a measurement apparatus used for measurement of the RF tag is described. The measurement apparatus mainly includes a reader/writer, a high frequency probe, and a measurement probe system. The reader/writer is based on EPCglobal Class-1 Generation-2. After the power of a carrier wave is set by the reader/writer, a modulated high frequency signal is output from the reader/writer to the RF tag via the high frequency probe connected with a coaxial cable. Note that the RF tag used for measurement does not include an antenna. Therefore, the modulated high frequency signal (an output signal) from the reader/writer is directly supplied to an input terminal (a terminal having the same potential as one terminal of the antenna) and a ground terminal (a terminal having the same potential as the other terminal of the antenna) in the RF tag via the high frequency probe. The measurement probe system is light-shielded and electromagnetically shielded, and is used for fixing the RF tag.

Then, a method for measuring the RF tag is described. A modulated high frequency signal was input from the reader/writer to the RF tag while the output power of a carrier wave from the reader/writer was changed, and the number of times in which the RF tag transmits a normal response was measured. Note that each output power value was measured five times.

Table 1 shows the response rates of the RF tag including the modulation circuit of the comparative example (see FIG. 9 and FIG. 10) and the response rates of the RF tag including the modulation circuit of one embodiment of the present invention (see FIG. 4A and FIG. 6). Note that table 1 shows a part of the range of the output power from the reader/writer, in which the response rate changes. The output power at which the response rate of the RF tag is 0 indicates the minimum output power necessary for the RF tag to response. The response rate of the RF tag of the comparative example was reduced to 60% at an output power of 5.28 mW from the reader/writer. On the other hand, the response rate of the RF tag of one embodiment of the present invention was 100% even at an output power of 5.04 mW. That is, the minimum output power of the RF tag including the modulation circuit of one embodiment of the present invention could be reduced by 0.24 mW as compared to that of the RF tag including the modulation circuit of the comparative example. In addition, the response range of the RF tag could be extended to the side of a lower power.

TABLE 1

| R/W Output Power [mW] | Comparative example RF tag response rate | | Embodiment of the present invention RF tag response rate |
|---|---|---|---|
| 4.70 | small | | 0 | 0 |
| 4.81 | ↑ | | 0 | 0 |
| 4.92 | | | 0 | 0 |
| 5.04 | | | 0 | 100 |
| 5.16 | | | 0 | 100 |

TABLE 1-continued

| R/W Output Power [mW] | Comparative example RF tag response rate | Embodiment of the present invention RF tag response rate |
|---|---|---|
| 5.28 | ↑ | 60 | 100 |
| 5.40 | ↑ | 20 | 100 |
| 5.53 | ↑ | 100 | 100 |
| 5.67 | ↑ | 100 | 100 |
| 5.81 | ↓ | 100 | 100 |
| 5.95 | large | 100 | 100 |

As shown in the above results, it was found that the minimum output power of the RF tag including the modulation circuit of one embodiment of the present invention could be reduced as compared to that of the RF tag including the modulation circuit of the comparative example. In other words, the RF tag of one embodiment of the present invention can be communicated with a reader/writer with lower power consumption as compared to the RF tag of the comparative example, which results in an increase in the maximum communication distance of the RF tag.

This application is based on Japanese Patent Application serial No. 2008-258443 filed with Japan Patent Office on Oct. 3, 2008, the entire contents of which are hereby incorporated by reference.

The invention claimed is:

1. A semiconductor device comprising an antenna and a modulation circuit;
   wherein the modulation circuit comprises a load, a diode and a transistor,
   wherein the load, the diode and a source and a drain of the transistor are connected in series between two consecutive branch points of the modulation circuit, between two terminals of the antenna,
   wherein the load comprises at least one of a resistor and a capacitor,
   wherein the transistor is controlled to be turned on or off in accordance with a signal input to a gate of the transistor, and
   wherein the diode is a diode-connected transistor.

2. The semiconductor device according to claim 1, wherein the diode is formed over a flexible substrate.

3. The semiconductor device according to claim 1, further comprising:
   a rectifier circuit, a demodulation circuit, a constant voltage circuit, and a logic circuit.

4. A cellular phone comprising the semiconductor device according to claim 1.

5. A personal computer comprising the semiconductor device according to claim 1.

6. The semiconductor device according to claim 1,
   wherein each of the two consecutive branch points is directly connected to one of the two terminals of the antenna.

7. A semiconductor device comprising an antenna and a modulation circuit;
   wherein the modulation circuit comprises a resistor, a diode, and a transistor,
   wherein the resistor, the diode and a source and a drain of the transistor are connected in series between two consecutive branch points of the modulation circuit, between two terminals of the antenna,
   wherein the transistor is controlled to be turned on or off in accordance with a signal input to a gate of the transistor, and
   wherein the diode is a diode-connected transistor.

8. The semiconductor device according to claim 7, wherein the diode is formed over a flexible substrate.

9. The semiconductor device according to claim 7, further comprising:
   a rectifier circuit, a demodulation circuit, a constant voltage circuit, and a logic circuit.

10. A cellular phone comprising the semiconductor device according to claim 7.

11. A personal computer comprising the semiconductor device according to claim 7.

12. The semiconductor device according to claim 7,
    wherein each of the two consecutive branch points is directly connected to one of the two terminals of the antenna.

13. The semiconductor device according to claim 7, wherein an active layer of the transistor comprises an oxide semiconductor layer.

14. The semiconductor device according to claim 13, wherein the oxide semiconductor layer comprises indium.

15. A semiconductor device comprising an antenna and a modulation circuit;
    wherein the modulation circuit comprises a capacitor, a diode, and a transistor,
    wherein the diode, the capacitor and a source and a drain of the transistor are connected in series between two consecutive branch points of the modulation circuit, between two terminals of the antenna,
    wherein the transistor is controlled to be turned on or off in accordance with a signal input to a gate of the transistor, and
    wherein the diode is a diode-connected transistor.

16. The semiconductor device according to claim 15, wherein the diode is formed over a flexible substrate.

17. The semiconductor device according to claim 15, further comprising:
    a rectifier circuit, a demodulation circuit, a constant voltage circuit, and a logic circuit.

18. A cellular phone comprising the semiconductor device according to claim 15.

19. A personal computer comprising the semiconductor device according to claim 15.

20. The semiconductor device according to claim 15,
    wherein each of the two consecutive branch points is directly connected to one of the two terminals of the antenna.

21. The semiconductor device according to claim 15, wherein an active layer of the transistor comprises an oxide semiconductor layer.

22. The semiconductor device according to claim 21, wherein the oxide semiconductor layer comprises indium.

* * * * *